United States Patent [19]

Barnes

[11] 3,837,514
[45] Sept. 24, 1974

[54] BOAT CARRIER FOR VEHICLES

[76] Inventor: Reno R. Barnes, 3420 Crestview Dr. South, Salem, Oreg. 97302

[22] Filed: Nov. 20, 1972

[21] Appl. No.: 308,290

[52] U.S. Cl. .......................... 214/450, 224/42.1 H
[51] Int. Cl. ............................................. B60r 9/00
[58] Field of Search... 214/450; 224/42.1 R, 42.1 D, 224/42.1 H, 42.1 E

[56] References Cited
UNITED STATES PATENTS

| | | | |
|---|---|---|---|
| 3,066,815 | 12/1962 | Johnson | 214/450 |
| 3,321,095 | 5/1967 | Groll | 214/450 |
| 3,460,694 | 8/1969 | Simms | 214/450 |

Primary Examiner—Robert J. Spar
Assistant Examiner—John Mannix

[57] ABSTRACT

A frame, adapted to be secured to the top of a vehicle, includes a pair of laterally spaced, longitudinal retaining members providing grooves arranged to receive the opposite gunwales of a boat. One of the members is formed of hinged sections arranged to be secured together releasably in gunwale-retaining position. Associated with the hinged sections is a cam member which functions, during closing of the hinged sections, to push the boat toward the opposite groove for entry therein of the associated gunwale. Upon opening of the hinged sections, the cam member functions to elevate the associated side of the boat and to retract the opposite gunwale from its associated groove.

6 Claims, 4 Drawing Figures

PATENTED SEP 24 1974 3,837,514
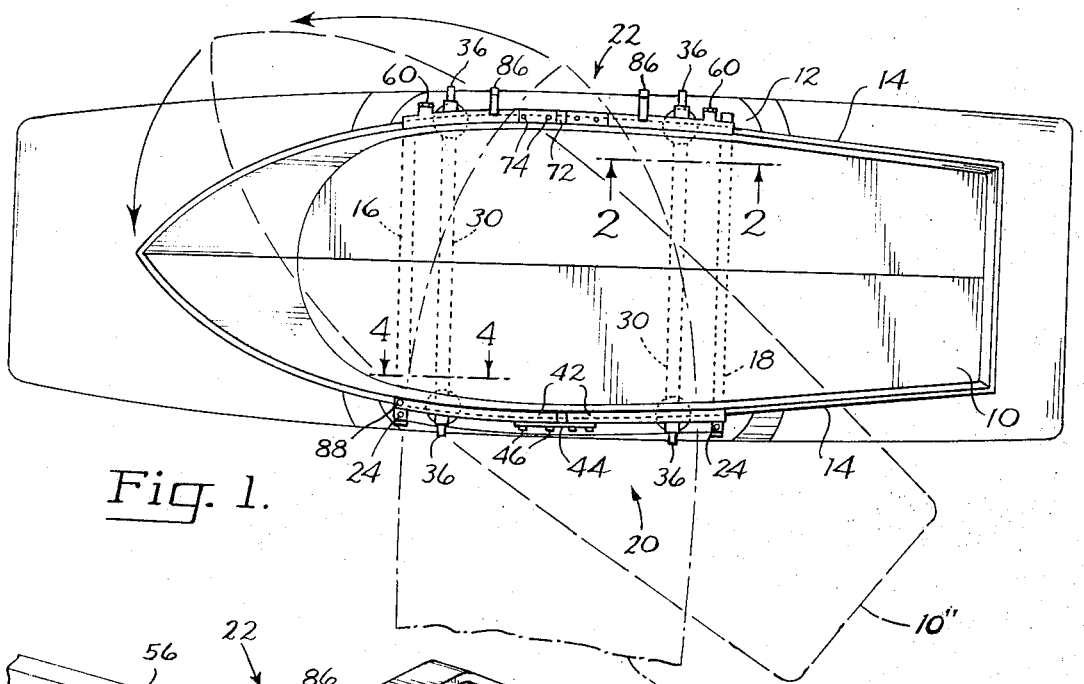
Fig. 1.
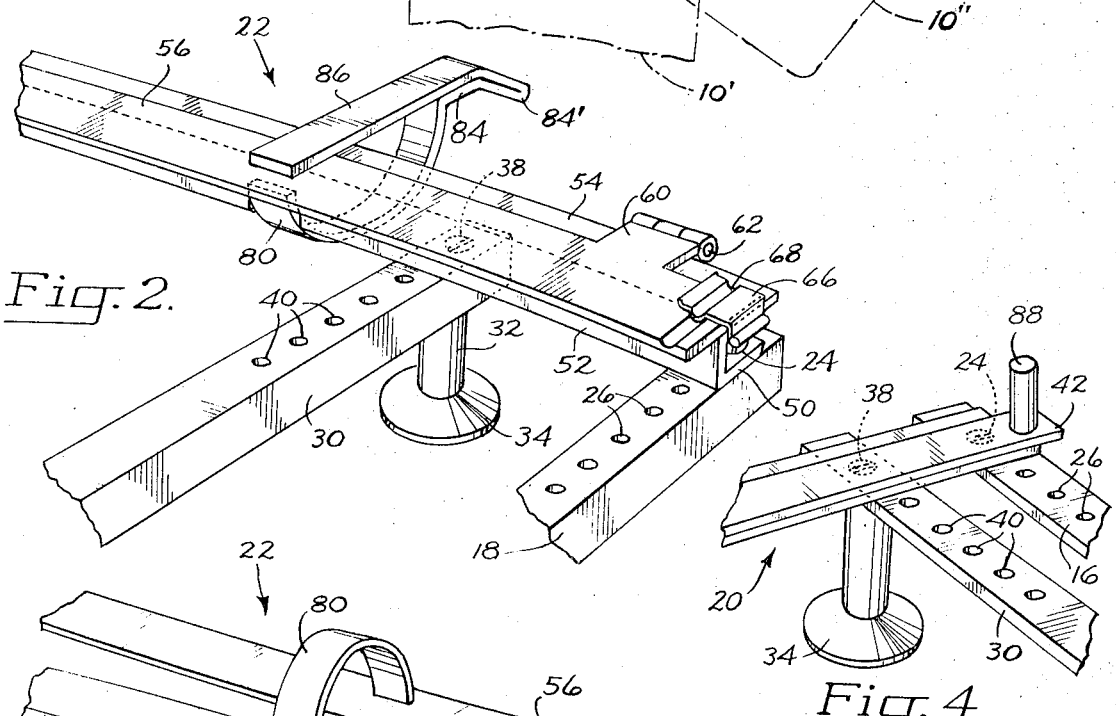
Fig. 2.
Fig. 4.
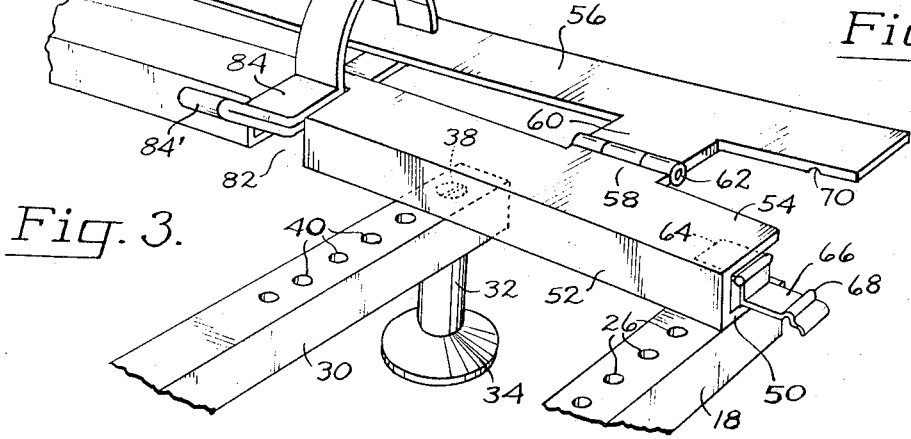
Fig. 3.

BOAT CARRIER FOR VEHICLES

BACKGROUND OF THE INVENTION

This invention relates to boat carriers for vehicles, and more particularly to a boat carrier by which to secure a boat to the top of a vehicle with speed and facility and without the use of tie-down ropes.

Boat carriers have been provided heretofore in a variety of structural forms. The more popular form, which is of more simplified and therefore more economical construction, requires manipulation of the boat by at least two persons and further requires the use of tie-down ropes anchored to the four corners of the vehicle to maintain the boat anchored in proper position atop the vehicle during transport. Carriers of this type are characterized disadvantageously by requiring the manual efforts of at least two persons to load and unload the boat, the restriction of vision presented to the vehicle driver by the tie-down ropes, and the possibility of serious accident should one or more of the tie-down ropes loosen or break during high speed travel of the vehicle.

Carriers of the more complex and therefore more costly types provided heretofore overcome the aforementioned disadvantages. However, their high cost has minimized their use.

SUMMARY OF THE INVENTION

In its basic concept, this invention provides a boat carrier which functions to secure a boat to the top of a vehicle by means of the opposed gunwales of the boat.

It is by virtue of the foregoing basic concept that the principal objective of this invention is achieved; namely, to overcome the aforementioned disadvantages of prior boat carriers, by providing a boat carrier of the class described which is of simplified construction for economical manufacture, which enables the mounting and dismounting of a boat by a single person, and which functions to anchor a boat to the top of a vehicle with maximum security without the use of tie-down ropes.

The foregoing and other objects and advantages of this invention will appear from the following detailed description, taken in connection with the accompanying drawing of a preferred embodiment.

BRIEF DESCRIPTION OF THE DRAWING

FIG. 1 is a plan view showing in full lines a boat mounted atop a vehicle by means of a boat carrier embodying the features of this invention, the boat being shown in broken lines in intermediate positions of mounting and dismounting.

FIG. 2 is a fragmentary perspective view of the adjustable component of the boat carrier, the same being shown in operative, boat-retaining position. FIG. 3 is a fragmentary perspective view, similar to FIG. 2, showing the adjustable component of the carrier in open, boat-releasing position.

FIG. 4 is a fragmentary perspective view of a fixed, boat-retaining component of the carrier.

DESCRIPTION OF THE PREFERRED EMBODIMENT

FIG. 1 illustrates a relatively small boat 10, for example about 14 feet in length, supported in inverted position on the top 12 of an automobile, by means of a carrier of this invention. As explained more fully hereinafter, the boat is secured to the carrier by means of its opposed gunwales 14.

The carrier of this invention comprises a frame which includes a pair of longitudinally spaced, transverse frame members 16 and 18 interconnecting a pair of laterally spaced gunwale retainers 20 and 22 by such means as bolts 24. A plurality of transversely spaced openings 26 in the frame members 16 and 18 receive the bolts selectively to adjust the lateral spacing between the retainers 20 and 22. The transverse frame members support an inverted boat 10 at longitudinally spaced points, and each lateral retainer engages a gunwale of the boat at longitudinally spaced positions, whereby effectively to secure the boat to the frame against lateral and longitudinal displacement.

The carrier frame is adapted to be mounted upon the top 12 of a vehicle. In the embodiment illustrated, each of the opposite ends of each of the pair of transverse support members 30 is provided with a downwardly extending post 32 the bottom end of which is fitted with a protective base 34 for engaging the top of the vehicle. The protective base may be in the form of a block of rubber, synthetic plastic, wood, or other suitable material, or it may be in the form of a suction cup. In any event, it serves to protect the finish of the top of the vehicle, and the upstanding post serves to elevate the transverse support members 30 above the vehicle top.

The transverse support members are secured to the vehicle top by any suitable, conventional means. One such means comprises a plurality of releasable hook assemblies 36 (FIG. 1) each secured at one end to one end of each transverse support member. The opposite end of each hook assembly is adapted to be releasably secured to the rain gutters or upper window edges which extend longitudinally along opposite sides of the vehicle. A variety of such hook devices are available commercially, and since they form no part of the present invention they are not illustrated in detail.

The carrier frame is secured to the transverse support members 30 by such means as bolts 38 which extend through openings in the retainer members 20 and 22 and selected ones of a plurality of openings 40 in the transverse support members. The latter openings are spaced apart on the same centers as the openings 26, to accommodate adjustment of the lateral spacing of the retainers, as previously explained.

In the embodiment illustrated, the gunwale retainer 20 comprises a pair of elongated s-shaped members 42 (FIG. 4) disposed in longitudinal extention relative to each other and interconnected releasably for longitudinal adjustment by such means as an elongated bar 44 (FIG. 1). The bar abuts the outer side of the intermediate, upright portion of the s-shaped members and is provided with longitudinally spaced openings for the reception of connecting bolts 46. The intermediate portions of the s-shaped members also are provided with a plurality of openings spaced apart longitudinally on the same centers as the bolts, for selective reception of the latter. By this means the s-shaped members may be connected together in various positions of longitudinal adjustment, to accommodate boats of various lengths.

It will be understood, of course, that the gunwale retainer 20 may comprise a single elongated s-shaped member, in the event the foregoing feature of adjustability is not required.

The retainer members 42 form, with the underlying transverse frame members 16 and 18 and support members 30, a plurality of longitudinally spaced grooves (FIG. 4) proportioned to receive therein a gunwale 14 of a boat. Being spaced apart, the grooves provide for engagement of the gunwale at longitudinally spaced positions. The retainer members preferably are curved to correspond with the curvature of the associated gunwale. If desired, a greater degree of curvature may be provided in order to accommodate a variety of shapes of boats.

The opposite gunwale retainer 22 of the pair also provides a plurality of longitudinally spaced grooves for engaging the opposite gunwale at longitudinally spaced positions. In addition, it is so constructed as to accommodate opening of the retaining grooves in order to effect release of the gunwale. To this end, the retainer is formed of two sections, one of which is movable relative to the other. The fixed section comprises an elongated structural member of generally channel shape in cross section, providing a horizontal bottom portion 50, an intermediate vertical portion 52 and a top horizontal portion 54. The bottom portion is secured to the transverse frame members 16 and 18 by the bolts 24 and to the support members 30 by the bolts 38.

The second section of retainer 22 comprises an elongated structural member 56. In the operative position of the retainer illustrated in FIG. 2, the member 56 overlies the top portion 54 of the first section and extends inwardly of the intermediate section 52 to form with the latter and the transverse members 16, 18 and 30 a plurality of gunwale receiving grooves.

The two sections of the retainer are joined together for movement of the second section relative to the first section. In the embodiment illustrated, the top portion 54 of the first section and the member 56 of the second section are provided with a pair of longitudinally spaced, outwardly projecting hinge tabs 58 and 60, respectively, which are connected together pivotally by means of a hinge pin 62. Accordingly, the second section may be pivoted between the operative, closed position illustrated in FIG. 2 and the retracted, open position illustrated in FIG. 3, by swinging the second section relative to the first section about the axis of the hinge pin.

In the event the retaining grooves of the retainers 20 and 22 need to enlarged vertically, to accommodate boats having thicker gunwales, shims (not shown) may be interposed between the s-shaped member 42 and the underlying members 16, 18 and 30, as well as between the bottom portion 50 and said members 16, 18 and 30.

Means is provided for securing the second section to the first section in the operative, closed position illustrated in FIG. 2. Such means is illustrated therein as a pair of hinged clamps located one at each end of the retainer 22. One section 64 of each clamp is secured to the top portion 54 and the other section 66 is provided with a detent 68 adapted to be secured releasably, by a snap action, in a groove 70 provided in the second section 56.

Although the first and second sections of the gunwale retainer 22 may be formed of single, elongated structural pieces, they are shown formed of two longitudinal sections, in the manner of the two longitudinal sections 42 of the first described gunwale retainer 20. The two sections are interconnected for longitudinal adjustment, by means of elongated bars 72 (FIG. 1) and associated bolts 74. One of the bars interconnects the adjacent ends of the channel-shaped first section, and the other bar interconnects the adjacent ends of the second section, in the same manner as the bar 44 previously described.

It will be understood that both of the laterally spaced gunwale retainers may be provided in the form of the second retainer 22 described hereinbefore, so that the longitudinally spaced retaining grooves of both retainers may be opened to receive and to release the opposed gunwales of a boat. However, with one of the pair of gunwales retainers provided in the fixed form of the first retainer 20 described, it will be understood that the loading of a boat onto the carrier requires that the boat initially be displaced laterally toward the adjustable retainer 22, with the opposite gunwale positioned inwardly of the fixed retainer 20. The boat then is pushed laterally so that said gunwale enters the fixed retaining grooves in the retainer 20, whereupon the opposite gunwale will rest upon the transverse members 16, 18 and 30 and adjacent the intermediate portion 52 of the adjustable retainer. It is understood, of course, that the second section 56 of the retainer would first have been swung to the open position illustrated in FIG. 3. Said second section then is swung to the operative, closed position illustrated in FIG. 2, to secure the associated gunwale between the two sections and the underlying transverse members.

Means is provided for effecting said lateral movement of the boat to bring the gunwale into the retaining grooves of the fixed retainer member 20 simultaneously with closing of the second section 56 of the adjustable retainer 22. In the embodiment illustrated, such means comprises a pair of longitudinally spaced, curved cam mambers 80 secured at one end to the underside of the second section 56. Each of the cam members extends therefrom through a slot 82 in the first section and is so arranged that as the second section is pivoted from the open position shown in FIG. 3 to the closed position shown in FIG. 2, the working surface of the cam progressively traverses the top portion 54 of the first section of the retainer 22 inwardly toward the opposite retainer 20. In so doing, the cam members pushed the boat laterally toward said opposite retainer 20 and causes the opposite gunwale to enter the retaining grooves of said retainer 20. Upon movement of the second section 56 pivotally to the closed position illustrated in FIG. 2, the associated gunwale is captured in the retaining grooves of the second retainer 22. The hinged clamp sections 66 then may be snapped into the associated grooves 70 to lock the sections of the retainer 22 together.

Means also is provided for effecting retraction of the boat gunwale from the groove of the fixed retainer 20, preliminary to unloading the boat from the carrier. In the embodiment illustrated, such means is provided by a lifting tab 84 which extends from the end of each cam member 80 opposite its connection to the second section 56 and is provided at its outer end with an angularly offset portion 84'. Referring particularly to FIG. 3, each ligting tab is arranged to swing upwardly through the associated slot 82 at least to the level of the top portion 54 of the first section as the second section 56 is swung to its open position. The tabs thus engage the lower side of the associated gunwale and lift it clear of the vertical portion 52 of the retainer. Upon further opening of the section 56 the offset portion 84' causes the boat to be pulled laterally outward in the direction to extract the opposite gunwale from the grooves of the fixed retainer 20.

The cam member 80 and lifting tab are reinforced structurally by the extension 86 which is doubled back from the tab and secured at its terminal end to the second section 56 on the side thereof opposite the attachment of the cam member.

An upstanding guide post 88 on the forward end of the fixed retainer 20 is provided to assist the loading and unloading of a boat. The loading operation is as follows: The boat 10 is positioned on the ground in upright condition to the side of and perpendicular to the vehicle, stern first. The bow then is lifted upward and swung to the position in which the boat leans against the outer side of the fixed retainer 20 at the side of the vehicle. In this position the boat is substantially inverted, with the gunwales resting against the fixed retainer and the boat is disposed at substantially right angles to the longitudinal axis of the vehicle, as indicated by the broken line position 10' in FIG. 1.

The operator then lifts the stern of the boat to the upper level of the carrier and swings it in a counter-clockwise direction, through the intermediate position illustrated by the broken lines 10'', to the full line position in which it is aligned with the longitudinal axis of the vehicle. This swinging of the boat is assisted by the guide post 88.

As the inverted boat reaches the position of longitudinal alignment with the vehicle, the gunwale adjacent the fixed retainer 20 is positioned inwardly thereof and the opposite gunwale rests upon the top portion 54 of the first section of the adjustable retainer 22 (the second section 56 having been swung to the open position illustrated in FIG. 3). The second section 56 then is pivoted about the hinge pin 62 toward the closed position illustrated in FIG. 2, whereupon the cam members function to push the boat laterally and cause the opposite gunwale to enter the grooves of the fixed retainer 20. Upon movement of the second section 56 to the closed position of FIG. 2, the associated gunwale is captured under it, as previously explained. The section 66 of each hinged clamp then is snapped into its associated groove 70 to lock the boat firmly to the carrier.

The unloading operation is substantially the reverse procedure, as will be understood. However, upon opening of the section 56 the lifting tabs 84, 84' operate to extract the opposite gunwale from the fixed retainer 20 as previously explained.

From the foregoing it will be appreciated that the present invention provides a boat carrier of simplified and therefore economical construction, adapted for mounting on the top of a wide variety of types of vehicles and operable with speed and facility to secure a boat firmly to the vehicle without the use of tie-down ropes. The carrier may be constructed for adjustment longitudinally and laterally to accommodate boats of various sizes and shapes, the smaller boats being capable of loading and unloading by a single person.

It will be apparent to those skilled in the art that various changes may be made in the size, shape, type, number and arrangement of parts described hereinbefore. For example, the transverse support members 30 may be omitted, and the posts 32 secured directly to the bottom portions of the retainers 20 and 22 at appropriate positions accommodating mounting on the tops of various types and styles of vehicles. This and other changes may be made without departing from the spirit of this invention.

Having now described my invention and the manner in which it may be used, I claim:

1. A boat carrier for vehicles, comprising:
   a. a frame adapted to be secured to the top of a vehicle and including a pair of laterally spaced gunwale retaining means each arranged for engaging a gunwale of a boat at longitudinally spaced positions, whereby said pair of retaining means releasably secures the opposed lateral gunwales of a boat to said frame against lateral and longitudinal displacement,
   b. the frame also including a pair of longitudinally spaced transverse frame members interconnecting said laterally spaced gunwale retaining means,
   c. at least one of said retaining means including a pair of members one movable pivotally relative to the other between an operative position forming with said transverse frame members longitudinally spaced gunwale receiving grooves, and a retracted position opening said grooves for releasing the gunwale,
   d. cam means on said one movable member arranged upon pivotal movement of the latter to said operative position to traverse said one retaining means inwardly and bear against the adjacent surface of a boat gunwale, whereby to push the boat laterally toward the opposite laterally spaced gunwale retaining means and cause the opposite gunwale to enter the associated retaining means.

2. The boat carrier of claim 1 wherein the cam means includes a gunwale lifting member arranged to underlie a boat gunwale in the operative position of said one movable member and to engage and lift said gunwale laterally during movement of said one movable member toward said retracted position, whereby to extract the opposite gunwale from its retaining means.

3. A boat carrier for vehicles, comprising:
   a. a frame adapted to be secured to the top of a vehicle and including a pair of laterally spaced gunwale retaining means each arranged for engaging a gunwale of a boat at longitudinally spaced positions, whereby said pair of retaining means releasably secures the opposed lateral gunwales of a boat to said frame against lateral and longitudinal displacement,
   b. the frame also including a pair of longitudinally spaced transverse frame members interconnecting said laterally spaced gunwale retaining means,
   c. at least one of said retaining means including a pair of members one movable relative to the other between an operative position forming with said transverse frame members longitudinally spaced gunwale receiving grooves, and a retracted position opening said grooves for releasing said gunwale, and
   d. cam means on said one movable member arranged upon movement of the latter to said operative position to traverse said one retaining means inwardly and bear against the adjacent surface of a boat gunwale, whereby to push the boat laterally toward the opposite laterally spaced gunwale retaining means and cause the opposite gunwale to enter the associated retaining means, the cam means including a gunwale lifting member arranged to underlie a boat gunwale in the operative position of said one movable member and to engage and lift said gunwale laterally during movement of said one movable member toward said retracted position, whereby to extract the opposite gunwale from its retaining means.

4. A boat carrier for vehicles, comprising:
a. a frame adapted to be secured to the top of a vehicle and including a pair of laterally spaced gunwale retaining means each arranged for engaging a gunwale of a boat at longitudinally spaced positions, whereby said pair of retaining means releasably secures the opposite lateral gunwale of a boat to said frame against lateral and longitudinal displacement,
b. the frame also including a pair of longitudinally spaced transverse frame members interconnecting said laterally spaced gunwale retaining means,
c. at least one of said retaining means including a pair of members one movable relative to the other between an operative position forming with said transverse frame members longitudinally spaced gunwale receiving grooves, and a retracted position opening said grooves for releasing the gunwale, said one laterally spaced gunwale retaining means comprising
  1. a first member secured to the transverse frame members,
  2. a second member connected to the first member for pivotal movement on an axis extending in the longitudinal direction of the frame between an operative position overlying the first member and forming with the inner surface of the latter and said transverse frame members longitudianlly spaced channel-shaped gunwale receiving grooves, and the retracted position upward and laterally outward of said inner surface for releasing a boat gunwale, and
  3. means securing the first and second members together releasably in said operative position.

5. The boat carrier of claim 4 including cam means on said second member arranged upon movement of the latter to said operative position to traverse said first member inwardly and bear against the adjacent surface of a boat gunwale, whereby to push the boat laterally toward the opposite laterally spaced gunwale retaining means and cause the opposite gunwale to enter the assocaited retaining means.

6. The boat carrier of claim 5 wherein the cam means includes a gunwale lifting member arranged to underlie a boat gunwale in the operative position of said second member and to engage and lift said gunwale laterally during movement of said second member toward said retracted position, whereby to extract the opposite gunwale from its retaining means.

* * * * *